United States Patent
Wolfram

(10) Patent No.: US 8,170,137 B2
(45) Date of Patent: May 1, 2012

(54) METHOD AND SYSTEM FOR TRANSMITTING DATA FROM A MEDIUM ACCESS CONTROL DEVICE VIA A PHYSICAL LAYER TO AN ANTENNA

(75) Inventor: Drescher Wolfram, Dresden (DE)

(73) Assignee: NXP B.V., Eindhoven (NL)

( * ) Notice: Subject to any disclaimer, the term of this patent is extended or adjusted under 35 U.S.C. 154(b) by 920 days.

(21) Appl. No.: 12/158,308

(22) PCT Filed: Dec. 14, 2006

(86) PCT No.: PCT/IB2006/054837
§ 371 (c)(1),
(2), (4) Date: Jun. 19, 2008

(87) PCT Pub. No.: WO2007/072344
PCT Pub. Date: Jun. 28, 2007

(65) Prior Publication Data
US 2008/0267315 A1    Oct. 30, 2008

(30) Foreign Application Priority Data
Dec. 19, 2005   (EP) .................................... 05112408

(51) Int. Cl.
*H04L 27/00* (2006.01)
(52) U.S. Cl. ...................................... 375/295; 375/260
(58) Field of Classification Search .................. 375/260, 375/295
See application file for complete search history.

(56) References Cited

U.S. PATENT DOCUMENTS

| | | | |
|---|---|---|---|
| 4,837,675 A * | 6/1989 | Bean et al. ................. | 714/5.11 |
| 5,784,559 A | 7/1998 | Frazier et al. | |
| 6,526,370 B1 * | 2/2003 | Yu et al. ................. | 702/182 |
| 2003/0099253 A1 | 5/2003 | Kim | |
| 2003/0174048 A1 | 9/2003 | McCorkle | |
| 2003/0221013 A1 * | 11/2003 | Lockwood et al. ......... | 709/231 |
| 2004/0151109 A1 | 8/2004 | Batra et al. | |
| 2004/0161064 A1 * | 8/2004 | Brethour et al. ............ | 375/347 |

FOREIGN PATENT DOCUMENTS

| | | |
|---|---|---|
| JP | 10-013441 A | 1/1998 |
| JP | 2003-174491 A | 6/2003 |

OTHER PUBLICATIONS

ECMA International: "MAC-PHY Interface for ECMA-369" Internet Citation retrieved from HTTP://WWW.ECMA-INTERNATIONAL.ORG/PUBLICATIONS/FILES/ECMA-ST/ECMA-369. PDF (Dec. 2007).
WIMEDIA Alliance: "ECMA International Standards" Internet Citation retrieved from HTTP://WWW.WIMEDIA.ORG/EN/RESOURCES/EIS.ASP (Jun. 2008).

* cited by examiner

*Primary Examiner* — Emmanuel Bayard

(57) ABSTRACT

The invention relates to a method and a system for transmitting data from a medium access control device (2) via a digital interface (IF1) to a physical layer (4) and to an antenna (5), wherein the physical layer (4) comprises a base band (4) with a base band controller (7) and a data processing pipeline (3) comprising a plurality of functional blocks (FB1 . . . 13), comprising the steps of: detecting an end of a frame of payload data, which leaves the antenna (5), at a predetermined point (P1 to P3) within the data processing pipeline (3), especially at the end of the data processing pipeline (3), thereupon, starting a timer (T1) for delaying a de-assertion of an activity signal (PHY_ACTIVE) of the physical layer (4), and after expiration of the timer (T1), de-asserting the activity signal (PHY_ACTIVE).

12 Claims, 3 Drawing Sheets

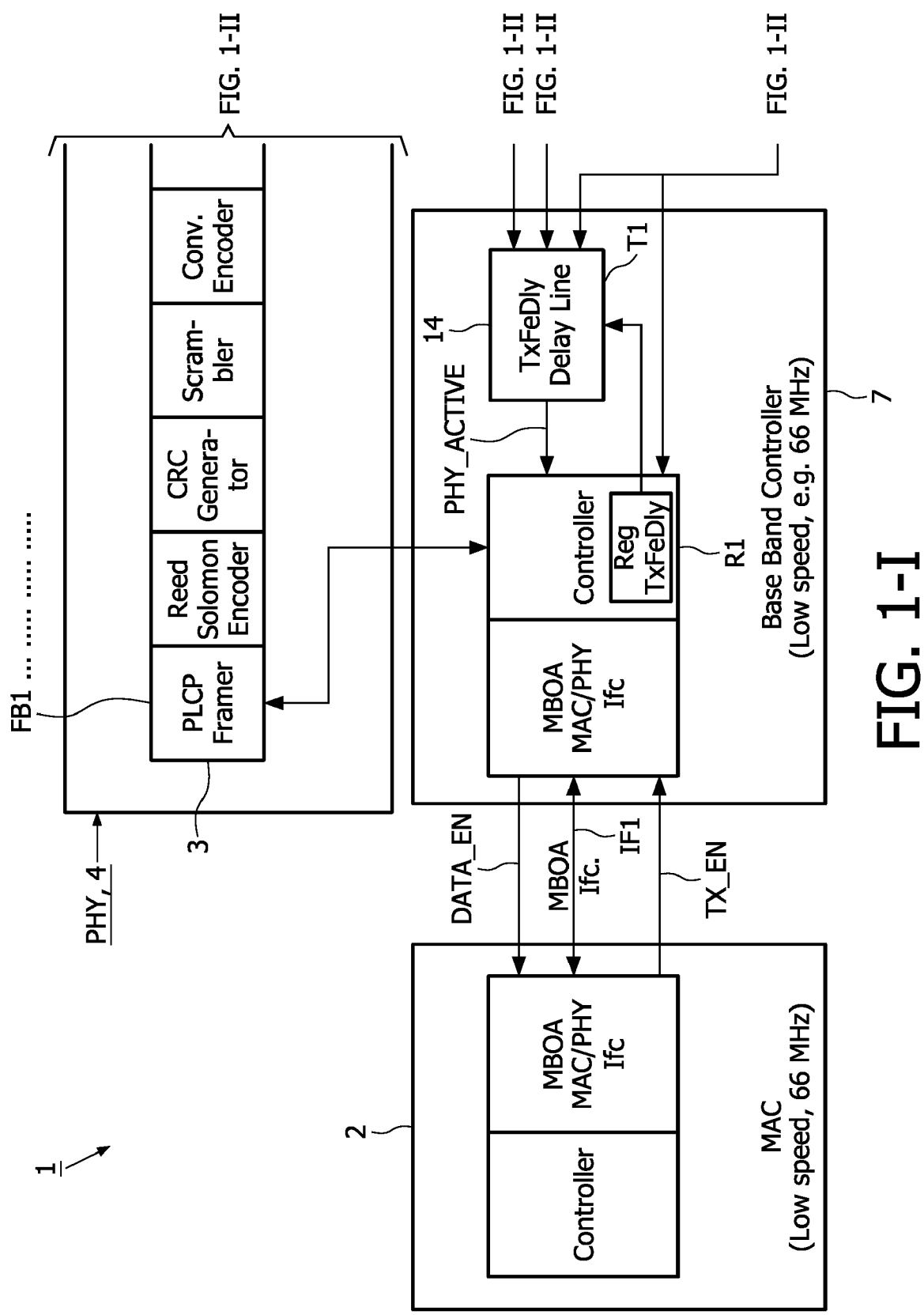
FIG. 1-I

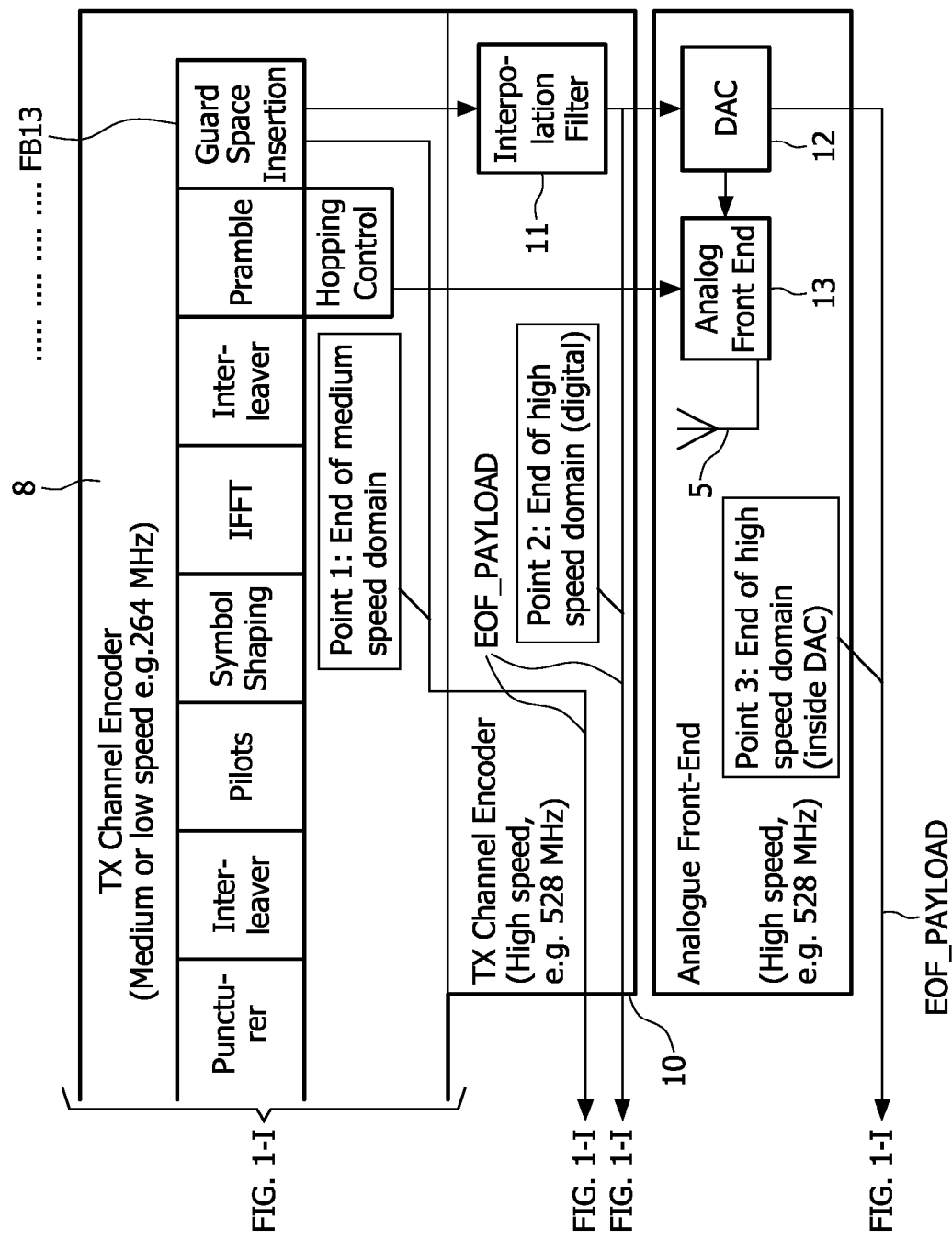
FIG. 1-II

METHOD AND SYSTEM FOR TRANSMITTING DATA FROM A MEDIUM ACCESS CONTROL DEVICE VIA A PHYSICAL LAYER TO AN ANTENNA

The invention relates to a method and a system for transmitting data from a medium access control device via a digital interface to a physical layer and to an antenna, wherein the physical layer comprises a base band with a base band controller and a data processing pipeline comprising a plurality of functional blocks.

Transmitting systems having such features are used in particular in a communications device (also called UWB transmitter, with UWB=ultra-wide band). The transmitting systems are part of a transceiver, such as of an ultra-wide band transceiver which could be integrated in several electronic devices such as in a pocket PC, in a mobile phone, in a digital camera, etc.

The technical specification for a digital interface (shortly called MAC-PHY interface) between a medium access control device (shortly called MAC) and a physical layer (shortly called PHY) requires a certain timing of the transmit path in order to have interoperable devices, which fulfil the standard in a consistent manner.

Normally, the physical layer indicates an actively transmitting circuit by a standard active signal called "PHY_ACTIVE". The "PHY_ACTIVE"-signal is supposed to get asserted, if the physical layer transmits the first sample of the preamble into the air at the antenna and is supposed to get de-asserted, at the time the last sample of the encoded payload pattern has been transmitted at the antenna.

However, for asserting the "PHY_ACTIVE"-signal, a standard parameter "TxDelay" (for transmission delay) is required by the technical specification of the transmitter's dynamic register set. This parameter communicates the latency between the assertion of transmission enable signal "TX_EN" of the medium access control device and the assertion of "PHY_ACTIVE"-signal of the physical layer. The medium access control device may take the specific "TxDelay"-parameter of the physical layer to adjust internal timing calculations.

For de-asserting the "PHY-ACTIVE"-signal, the technical specification also requires a real-time de-assertion of the "PHY_ACTIVE"-signal exactly at the time when the last sample leaves the antenna.

Due to the high-speed front-end circuit (running at 528 MHz or 1056 MHz) the real-time tracking of the last sample to the antenna is difficult. The tracking of the last sample would require a high effort in the physical layer hardware. Moreover, for an ultra-wide band system certain different data rates are defined. Hence, the digital channel encoder device of the physical layer typically has different latency for different rates. That is why it is difficult to assign one fixed delay value for the complete transmitter circuit operating in different modes and rates.

It is object of the invention to specify a method and a system for transmitting data from a medium access control device via a digital interface to a physical layer and to an antenna, by which it is possible to overcome the difficulties of implementation of the exact timing requirements for the "PHY_ACTIVE"-signalization found in the prior art, i.e. to reflect the accurate timing behaviour of the physical layer to the medium access control device during the transmission.

The problem is solved by a method comprising the features given in claim 1 and by a system comprising the features given in claim 7.

Advantageous embodiments of the invention are given in the respective dependent claims.

According to the invention, an end of a frame of payload data, which leaves the antenna, is detected at a predetermined point within the data processing pipeline. Preferably, the point in the pipeline is located as close as possible at the end of the pipeline, close to the digital to analogue converter and to the antenna respectively. Thereupon, a timer is started for the purpose of delaying a de-assertion-action of the activity signal of the physical layer. After expiration of the timer, the activity signal is de-asserted. This delay before de-asserting the activity signal enables the base band controller to compensate the specific delay of any subsequent vendor specific high-speed filter and/or digital-analogue converter, depending on the predetermined point in the transmit encoder pipeline where the end of the frame was detected. The de-assertion of the signal "PHY_ACTIVE"-signal is indicated to the medium access control device exactly at the actual end of frame transmission this way. The invention thus enables a consistent, exact timing signalization in transmit mode between the physical layer and the medium access control device such that the data can be correctly transmitted according the standard.

In a first alternative embodiment, a first predetermined point for detecting the end of a frame of data is at the end of the data processing pipeline in the time domain related part of the transmit encoder, especially inside the last functional block of this domain. This predetermined point is the last instance for detecting the end of a data package in the channel encoder digital logic, which typically runs at a lower speed than the high-speed digital front-end module. After this point no data rate dependent latency will appear anymore. The remaining latency of the data signal between this point and the antenna is typically represented by the latency of all modules of the high-speed digital front-end, the converter, and the analogue front end.

Preferably, the last functional block is designed as a guard space insertion block (also called ZSI or "Zero Suffix Insertion") and will be responsible for delaying the de-assertion of the activity signal of the physical layer, especially to track the end of a frame of payload data at or after the last functional block. For this purpose, the present invention equips the last functional block with a detection function for identifying the end of the frame of the payload data and with a timer for delaying the de-assertion of the activity signal.

In a second alternative embodiment, a second predetermined point for detecting the end of a frame of payload data is placed at the end of a high-speed encoder, especially inside or after an interpolation filter block. After this second point the latency is still data rate independent.

In a third alternative embodiment, a third predetermined point for detecting the end of a frame of payload data is at the end of a high-speed encoder, especially inside a digital-analogue-converter. After this third point the delay is still data rate independent, too.

Advantageously, the timer for delaying the de-assertion of the activity signal is an internal building block of the base band controller. The timer may also be placed in a module covering the last functional block or of the interpolation filter block or of the digital-analogue-converter or of the base band controller or of a separate delay line. This reduces time differences and potential delays in the timing control.

In summary, the invention describes a low-cost approach for fulfilling the timing specification of a medium access control device and a physical layer device in a flexible manner.

FIG. 1 shows a block schematic diagram of architecture of a device comprising a medium access control device and a physical layer device coupled to an antenna.

Figure 2:
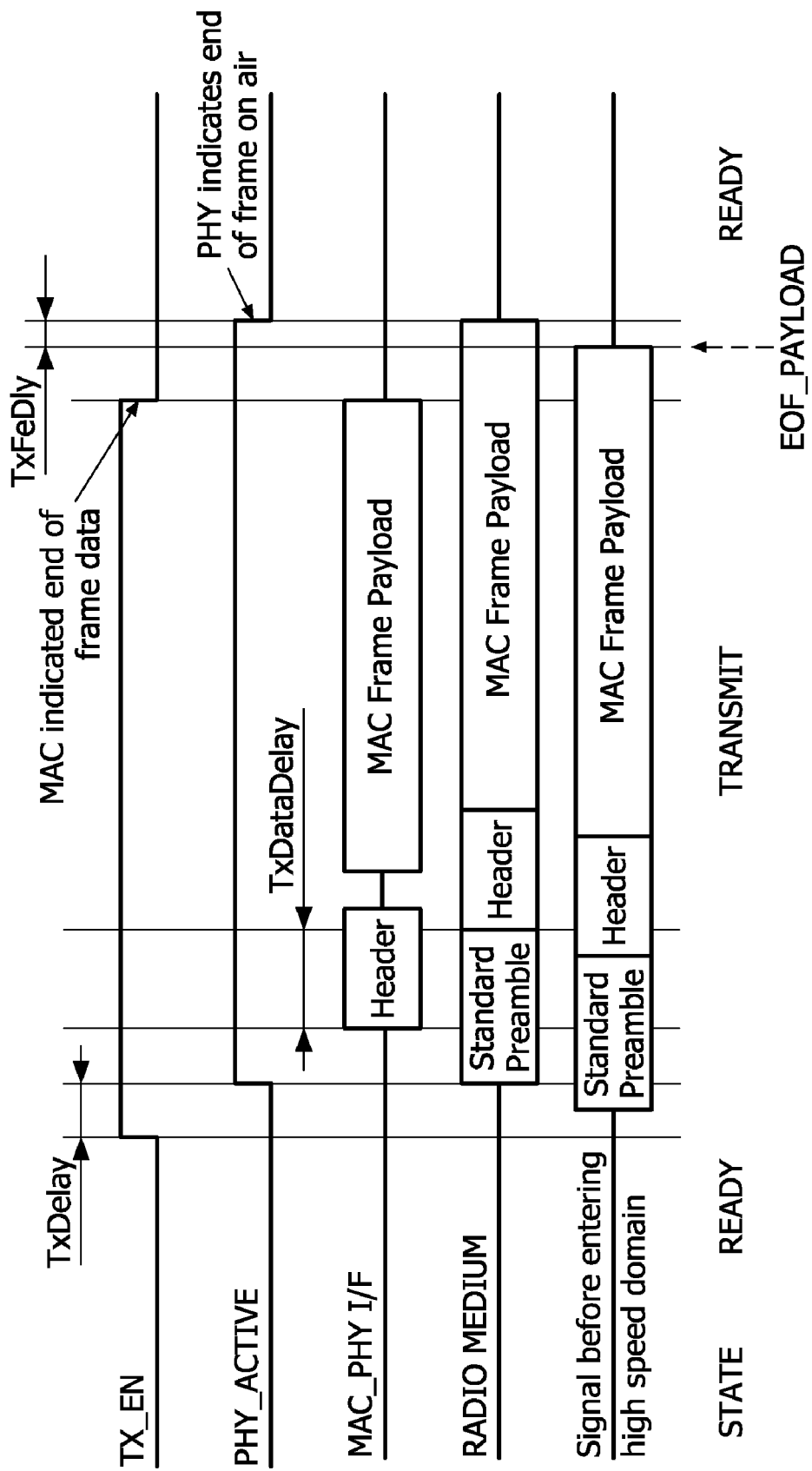
FIG. 2 shows an extract of the transmitter delay intervals for the burst transmit case using a delay line according to the invention.

FIG. 1 shows a general block diagram of an ultra-wide band transmitter 1 (in the following abbreviated as "transmitter 1"). The transmitter 1 is, for example, installed in a radio communications device (also called UWB transmitter, with UWB=ultra-wide band). The transmitter 1 could be part of a transceiver, such as of an ultra-wide band transceiver which could be integrated in several electronic devices such as in pocket PCs, in mobile phones, in digital cameras, etc.

The transmitter 1 transfers data from a medium access control device 2 via a digital interface IF1 to a physical layer 4 (also shortly called PHY) and to an antenna 5, wherein the physical layer 4 comprises a base band with a base band controller 7 and a data processing pipeline 3 comprising a plurality of functional blocks FB1 to FB13.

Basically, all functional blocks FB1 to FB13 processing data in the time domain or in frequency domain may be shifted from time domain into frequency domain and vice versa. For instance, the functional blocks FB1 to FB10 work in the frequency domain; the functional blocks FB11 to FB13 after the fast Fourier transformation functional block FB10 work in the time domain.

The data are in particular transmitted from the medium access control device 2 via the parallel interface part of the digital or so called MAC-PHY interface IF1 to the physical layer 4 and through the data processing pipeline 3 with the plurality of functional blocks FB1 to FB13 to an antenna 5. When a frame of payload data is transmitted, it always starts with a transmission of a preamble to the antenna 5, which is created by a preamble functional block FB12 in the data processing pipeline 3.

As a general rule, in a transmission mode the timing control is performed in the base band controller 7 of the physical layer 4. The medium access control device 2 initiates a frame transmission via the serial part of the digital interface IF1 by setting a command signal "TX_EN" (with TX_EN equals transmit enable; in the following abbreviated as "TX_EN"-signal). Usually, the base band controller 7 is triggered by this event and asserts an activity signal "PHY_ACTIVE" of the physical layer 4 (in the following abbreviated as "PHY_ACTIVE"-signal) after a predetermined delay signal "TxDelay" for delaying the latency between the assertion of the "TX_EN"-signal and the "PHY_ACTIVE"-signal.

Then the base band controller 7 starts transmission of the preamble immediately by utilising a start preamble signal. The preamble of the preamble block FB12 is a fixed sequence and hence does not have to be encoded by the other transmit path functional blocks FB1 to FB11. Thus, a transmit encoder 8 which comprises the data processing pipeline 3 has enough time to fill its data processing pipeline 3 during preamble transmission to the antenna 5 via a high-speed digital front-end device 10 and a radio frequency subsystem 11 until the encoded data signal reaches the preamble block FB12.

When the preamble transmission is completed, the encoded header and the frame of payload data have to be transmitted to the antenna 5 via the high-speed digital front-end device 10 and the radio frequency subsystem 11. Hence, the preamble functional block FB12 switches from reading the preamble memory to reading the data coming from the functional blocks FB1 to FB11 preceding the preamble block FB12 in the data processing pipeline 3 and the encoded header and the frame of payload data are transmitted to the antenna 5.

As mentioned above, the base band controller 7 starts and finishes transmission of the frame of payload data. Normally, the physical layer 4 indicates an actively transmitting circuit by the "PHY_ACTIVE"-signal, which is asserted by the base band controller 7, if the physical layer 4 transmits the first sample of the preamble into the air at the antenna 5. The base band controller 7 de-asserts the "PHY_ACTIVE"-signal, at the time the last sample of the encoded frame of payload pattern has been transmitted at the antenna 5.

The technical specification of de-asserting the "PHY_ACTIVE"-signal requires a real-time de-assertion. In other words: To ensure, that the last sample of the encoded payload pattern has been transmitted at the antenna 5, when the "PHY_ACTIVE"-signal is de-asserted, the de-assertion of the "PHY_ACTIVE"-signal has to be delayed. Due to the high-speed front-end circuit running at 528 MHz or 1056 MHz the real-time tracking of the last sample to the antenna 5 is difficult. Moreover, in an ultra-wide band system certain different data rates are defined. Hence, the digital channel encoder circuit 8 of the physical layer 4 may show different delays for different data rates. It is hence difficult to assign one fixed delay value for the complete transmitter circuit.

The invention relates to the detection of the end of the frame of payload data which leaves the antenna 5. For real-time tracking of this last sample to the antenna 5, the end of the frame of payload data is detected at a predetermined point P1 to P3 within the data processing pipeline 3, especially at the end of the data processing pipeline 3. This detection of the end of the frame of payload data at a predetermined point P1 to P3 is used to delay the de-assertion of the "PHY_ACTIVE"-signal. Therefore, the end of the frame of payload data is detected at such predetermined point P1 to P3 which is located as close as possible at the end of the data processing pipeline 3 and defines a new transmit front-end delay "TxFeDly" to delay the de-asserting of the "PHY_ACTIVE"-signal.

In more detail, for asserting the "PHY_ACTIVE"-signal, the known parameter "TxDelay" is assigned to a transmitter's dynamic register R1 set according to the technical specification in order to assign a circuit specific delay for the latency between the assertion of the "TX_EN"-signal of the medium access control device 2 and the "PHY_ACTIVE"-signal of the physical layer 4 before the transmission of the preamble and the payload data.

The invention proposes a new vendor specific register R1 with an additional function which defines a transmission front-end delay "TxFeDly" (with TxFeDly equals "transmission front-end delay"; further abbreviated as "TxFeDly"-delay) for a medium speed part, e.g. within the data processing pipeline, i.e. for the last functional block FB13, or for one of the high-speed front-end parts 10, 11, 12 or 13 of the transmitter 1; the "TxFeDly"-delay being countable by a timer T1 of a delay line 14. The register R1 may be located in the base band controller 7. There, it can be set via the digital interface IF1 by higher software layers from the medium access control device 2, e.g. by an application layer.

The value of the "TxFeDly"-delay is equivalent to the additional delay which the high-speed front-end 10 and/or the analogue front-end 13 including the digital-analogue-converter 12 add to the signal path to the antenna 5. In addition, it is proposed to track the end of a frame of payload data at one of predetermined points P1 to P3 after the last functional block FB13 of the data processing pipeline 3. From one of the predetermined points P1 to P3, an "EOF_PAYLOAD" signal may be sent to the delay line 14, for example. An assigned delay line 14 de-asserting the activity signal "PHY_ACTIVE" only after the time given by the delay "TxFeDly" starting with the "EOF_PAYLOAD" signal ensures that the "PHY_ACTIVE" signal is exactly de-asserted when the last sample leaves the antenna 5.

As a first alternative, the predetermined point P1 can be located at the end of the data processing pipeline 3 in the time domain related part of the transmit encoder 8, e.g. inside or after the last functional block FB13 of this domain. As a second alternative, the predetermined point P2 can be located at the end of the high-speed encoder 9, e.g. inside or after the interpolation filter block 11. As a third alternative, the predetermined point P3 can be located at the end of the high-speed encoder 9, e.g. inside or after the digital-analogue-converter 12.

The flexible delay line 14 controlled by the vendor specific register R1 for the "TxFeDly"-delay may be located in several places in the architecture. It may be arranged in the vicinity of one of the predetermined points P1 to P3 for tracking the end of the payload frame, i.e. within or after the last functional block FB13 of the data processing pipeline 3 or within or after a functional block after the last functional block FB13 of the data processing pipeline 3. Such a functional block may be an interpolation filter 11 or a digital-to-analogue converter 12. The delay line 14 may also be arranged separately from any of the following parts: the functional block FB13, the interpolations filter 11 or the digital-analogue converter 12.

Any vendor specific high-speed filter 11 and digital-to-analogue converter 12 might be used, because the delay register R1 in association with the delay line 14 is able to compensate its specific "TxFeDly"-delay.

FIG. 2 shows the principle transmitter delay intervals for the transmitting case including relevant signals involved in the data communication. Note that the signals are drawn from the perspective of the 66 MHz domain of the medium access control device 2. If signals of higher frequency domains are depicted, they are drawn aligned to the 66 MHz domain.

The transmit process is initiated by the medium access control device 2 asserting the command signal "TX_EN". Internally, the base band controller 7 uses the transmit enable signal "TX_EN" to indicate an active transmit path to the medium access control device 2 by asserting the physical layer active signal "PHY_ACTIVE". With the standard parameter "TxDelay", the assertion of the "PHY_ACTIVE"-signal is delayed.

An internal state machine of the base band controller 7 is then brought to transmit state. If this is done, the base band controller 7 indicates to the suffix insertion functional block FB13 to start generation and transmission of the preamble by asserting the preamble signal.

Furthermore, the preamble signal is used by the vendor specific register R1 for delaying the transmission of the payload data with a transmitting data delay "TxDataDelay". In more detail, the assertion of the control signal "TX_EN" also triggers a timer module T1 located in the base band controller 7 or in the delay line 14 or in the functional block FB13 to start counting the transmitting data delay "TxDataDelay". When the timer block T1 has counted the transmitting data delay time "TxDataDelay", it triggers the base band controller 7 to start reading header data from the medium access control device 2 by asserting a data enable signal denoted by "DATA_EN". At the same time it indicates an upcoming transmit stream to PLCP framer module (PFR) by asserting a start transmitting signal. At this time the transmit path beyond the functional block FB8 (=a mapper module MAP) is still busy with transmitting the preamble "PRE". Up to preamble functional block FB12 the transmit path, i.e. the data processing pipeline 3, is running idle. Hence, it should pre-process data until the data processing pipeline 3 is filled up to preamble functional block FB12 in order to seamlessly continue transmitting after the preamble functional block FB12 is done with sending the preamble patterns. Therefore, a built-in mechanism in the transmit path ensures that the data processing pipeline 3 is filled up to the preamble functional block FB12 and then stops until the preamble "PRE" was transmitted completely.

Following this guideline, the medium access control device 2 has to feed data into the base band controller 7 with a transmitting data delay time "TxDataDelay" in µs before the preamble "PRE" leaves the antenna 5 in order to have the data processing pipeline 3 filled. The transmitting data delay time "TxDataDelay" should be set to a value of:

4 µs>TxDataDelay>$\tau_{BBC}+\tau_{PFR}+\tau_{TXB}+\tau_{EPB}+\tau_{ITL}+\tau_{MAP}$+3+ TxDelay 4 µs>TxDataDelay>2.10 µs+TxDelay 4 µs>TxDataDelay>3.62 µs with BBC=Base Band Controller, PFR=PLCP framer, TXB=TX buffer, EPB=Convolutional encoder and puncturer, IFL=Interleaver, MAP=Mapper, TxDelay=transmitting delay time.

The value for the transmitting data delay time "TxDataDelay" should be selected close to the lower limit.

Furthermore, the base band controller 7 feeds data received from the medium access control device 2 through to the PFR module while asserting data signals which is an 8-bits wide data bus, a data valid signal which indicates valid data on data bus and a MAC request signal which indicates that the PFR module is not able to process data in this clock cycle.

It should be noted that a de-assertion of the MAC request signal will stall the data processing pipeline 3, but, without the delay line block 14 according to the invention, not at the same cycle as it is indicated to the digital interface IF1. It would take six clock cycles of the base band controller 7 to process the de-assertion MAC request signal. This is due to the one cycle internal delay of the base band controller 7 and the delay by two cycles when the data enable signal "DATA_EN" is de-asserted to the medium access control device 2. So in such a case, data would be lost and has to be resent if the loss is detected.

According to the invention, an end of medium speed domain signal "EOF_PAYLOAD", generated e.g. by the functional block FB13 inside the data processing pipeline 3 or by the interpolation filter 11 or by the digital-analogue converter 12 inside one of the high-speed front-end parts, indicates that after a given or determined delay time, which is the transmitting front-end delay time "TxFeDly", the last encoded pattern are approaching the antenna 5. The value of the "TxFeDly"-delay depends on different parameters and transmission features, such as the location of the predetermined detection point P1 to P3, the data rates, the transmission mode, etc.

On the positive edge of the end of medium speed domain signal or high speed domain signal "EOF_PAYLOAD", a programmable delay line 14 for the transmitting front-end delay "TxFeDly", located inside the delay line 14, is triggered. The programmable delay line 14 delays the end of medium speed domain signal or high speed domain signal "EOF_PAYLOAD" by a programmable time value which is set to the transmission front-end delay time "TxFeDly". The purpose of this programmable transmission front-end delay time "TxFeDly" is to be flexible in adapting the timing of the high-speed digital front-end 10 and the analogue front-end 13 with each other.

After the programmable transmitting front-end delay time "TxFeDly" the physical layer active signal "PHY_ACTIVE" corresponds to the end of medium speed domain signal or the high speed domain signal "EOF_PAYLOAD".

In a more detailed embodiment of the invention, the transmitting delay can be calculated as follows:

Once the data processing pipeline 3 is triggered it takes approximately the transmitting delay time "TxDelay" until the first preamble pattern reaches the antenna 5. This transmitting delay time "TxDelay" can be calculated in units of μs as:

$$TxDelay = \tau_{SIX} + \tau_{FFT} + \tau_{ZSI} + \tau_{IFI} + \tau_{AFE} + 2 \text{ or}$$

$$= \tau_{SIX} + \tau_{FFT} + \tau_{ZSI} + TxFeDly + 2$$

with SIX=Symbol shaping, FFT=Fast Fourier Transformation, ZSI=Zero Suffix Insertion, IFI=Interpolation Filter, AFE=Front-end Module including Antenna 5, TxFeDly=Transmission front-end delay time.

In summary, FIG. 2 clarifies the modification proposed by the invention. According to the invention, in a transmission mode the end of each frame of payload data leaving the antenna 5 is detected, for example, at one of the predetermined points P1 to P3, e.g. at point P1 at the output of the last functional block FB13 of the data processing pipeline 3, generating a signal "EOF_PAYLOAD" being sent to a delay line 14. Thereupon, a timer T1 in the delay line 14 is started for delaying the de-assertion of the activity signal "PHY_ACTIVE" with a transmitting front-end delay "TxFeDly". After expiration of the timer T1, the activity signal "PHY_ACTIVE" is de-asserted. The de-assertion of the data enable signal "DATA_EN" is thus indicated to the medium access control device 2 at the actual end of frame transmission this way.

LIST OF NUMERALS:

| | |
|---|---|
| 1 | Transmitter |
| 2 | Medium access control device |
| 3 | Data processing pipeline of digital base band |
| 4 | Physical layer module (PHY) |
| 5 | Antenna |
| 7 | Base band controller |
| 8 | Transmit encoder |
| 10 | High-speed digital front-end |
| 11 | Interpolation filter |
| 12 | Digital-analogue converter |
| 13 | Analogue front-end |
| 14 | Delay line |
| IF1 | MAC-PHY interface including a serial management interface and a parallel data interface connecting medium access control device and base band |
| FB1 to FB11 | Functional blocks |
| FB12 | Preamble functional block |
| FB13 | Suffix insertion functional block |
| TX_EN | Control signal "transmit enable" |
| DATA_EN | Control signal "data enable" |
| PHY_ACTIVE | Control signal "physical layer active" |
| EOF_PAYLOAD | End of payload signal |

The invention claimed is:

1. A method for transmitting data from a medium access control devices via a digital interface to a physical layer and to an antenna, wherein the physical layers comprises a base band controller and a data processing pipeline comprising a plurality of functional blocks, comprising the steps of:
    detecting an end of a frame of payload data, which leaves the antenna, at a predetermined point within the data processing pipeline, especially at the end of the data processing pipeline,
    thereupon, starting a timer for delaying the end of frame signalization until a de-assertion of an activity signal physical layer active of the physical layer, and
    after expiration of the timer, de-asserting the activity signal.

2. The method according to claim 1, wherein a first predetermined point for detecting the end of a frame of payload data is at the end of the data processing pipelines of the base band controller, especially inside the last functional block.

3. The method according to claim 1, wherein the last functional block is designed as a guard space insertion block for delaying the de-assertion of the activity signal of the physical layer.

4. The method according to claim 1, wherein a second predetermined point for detecting the end of a frame of payload data is at the end of a high-speed base band transmit encoder, especially inside or after an interpolation filter block.

5. The method according to claim 1, wherein a third predetermined point for detecting the end of a frame of payload data is at the end of a high-speed encoder, especially inside a digital-analogue-converter.

6. The method according to claim 1, wherein an internal timer of the last functional block or of an interpolation filter block or of a digital-analogue-converter or of the base band controller or of a separate delay line is used for counting the delay.

7. A system for transmitting data from a medium access control device via a digital interface to a physical layers and to an antenna, wherein the physical layer comprises a base band with a base band controller and a data processing pipeline comprising a plurality of functional blocks, wherein the system:
    detects an end of a frame of payload data, which leaves the antenna, at a predetermined point within the data processing pipeline, especially at the end of the data processing pipeline,
    thereupon, starts a timer for delaying a de-assertion of an activity signal of the physical layer, and
    after expiration of the timer, de-asserts the activity signal.

8. The system according to claim 7, wherein a first predetermined point for detecting the end of a frame of payload data is at the end of the data processing pipeline, especially inside the last functional block.

9. The system according to claim 7, wherein the last functional block is designed as a guard space insertion block for delaying the de-assertion of the activity signal of the physical layer.

10. The system according to claim 7, wherein a second predetermined point for detecting the end of a frame of payload data is at the end of a high-speed encoder, especially inside or after an interpolation filter block.

11. The system according to claim 7, wherein a third predetermined point for detecting the end of a frame of payload data is at the end of a high-speed encoder, especially inside a digital-analogue-converter.

12. The system according to claim 7, wherein the timer is an internal timer of the last functional block or of a interpolation filter block or of a digital-analogue-converter or of the base band controller or of a separate delay line.

* * * * *